(12) United States Patent
Rajamony et al.

(10) Patent No.: US 7,281,092 B2
(45) Date of Patent: Oct. 9, 2007

(54) SYSTEM AND METHOD OF MANAGING CACHE HIERARCHIES WITH ADAPTIVE MECHANISMS

(75) Inventors: Ramakrishnan Rajamony, Austin, TX (US); Hazim Shafi, Austin, TX (US); William E. Speight, Austin, TX (US); Lixin Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 272 days.

(21) Appl. No.: 11/143,328

(22) Filed: Jun. 2, 2005

(65) Prior Publication Data

US 2006/0277366 A1 Dec. 7, 2006

(51) Int. Cl.
*G06F 12/00* (2006.01)

(52) U.S. Cl. ............... 711/122; 711/133; 711/144; 711/159

(58) Field of Classification Search ........... 711/122, 711/133, 144, 159
See application file for complete search history.

(56) References Cited

U.S. PATENT DOCUMENTS

| | | | | |
|---|---|---|---|---|
| 4,173,781 A | * | 11/1979 | Cencier | 711/117 |
| 6,321,300 B1 | * | 11/2001 | Ornes et al. | 711/135 |
| 6,751,706 B2 | * | 6/2004 | Chauvel et al. | 711/122 |
| 6,874,056 B2 | * | 3/2005 | Dwyer et al. | 711/3 |
| 2004/0024792 A1 | * | 2/2004 | Chauvel et al. | 707/200 |
| 2006/0015689 A1 | * | 1/2006 | Okawa et al. | 711/143 |
| 2006/0143389 A1 | * | 6/2006 | Kilian et al. | 711/130 |
| 2006/0143396 A1 | * | 6/2006 | Cabot | 711/134 |
| 2007/0094450 A1 | * | 4/2007 | VanderWiel | 711/133 |

\* cited by examiner

*Primary Examiner*—Stephen C. Elmore
(74) *Attorney, Agent, or Firm*—Casimer K. Salys; Dillon & Yudell LLP (57) ABSTRACT

A system and method of managing cache hierarchies with adaptive mechanisms. A preferred embodiment of the present invention includes, in response to selecting a data block for eviction from a memory cache (the source cache) out of a collection of memory caches, examining a data structure to determine whether an entry exists that indicates that the data block has been evicted from the source memory cache, or another peer cache, to a slower cache or memory and subsequently retrieved from the slower cache or memory into the source memory cache or other peer cache. Also, a preferred embodiment of the present invention includes, in response to determining the entry exists in the data structure, selecting a peer memory cache out of the collection of memory caches at the same level in the hierarchy to receive the data block from the source memory cache upon eviction.

28 Claims, 5 Drawing Sheets

| CACHE TAG 302 | COUNTER 304 |
|---|---|
| 306a | |
| 306b | |
| ⋮ | |
| 306n-1 | |
| 306n | |

SYSTEM AND METHOD OF MANAGING CACHE HIERARCHIES WITH ADAPTIVE MECHANISMS

This invention was made with U.S. Government support under DARPA HPCS Phase II, Contract # NBCH3039004. THE U.S. GOVERNMENT HAS CERTAIN RIGHTS IN THIS INVENTION.

BACKGROUND OF THE INVENTION

1. Technical Field

The present invention relates in general to the field of data processing systems. More particularly, the present invention relates to the field of memory management in data processing systems. Still more particularly, the present invention relates to a system and method of managing cache hierarchies with adaptive mechanisms.

2. Description of the Related Art

A conventional multi-processor data processing system (referred hereinafter as an MP), typically includes a system memory, input/output (I/O) devices, multiple processing elements that each include a processor and one or more levels of high-speed cache memory, and a system bus coupling the processing elements to each other and to the system memory and I/O devices. The processors all utilize common instruction sets and communication protocols, have similar hardware architectures, and are generally provided with similar memory hierarchies.

Caches are commonly utilized to temporarily store values that might be accessed by a processor in order to speed up processing by reducing access latency as compared to loading needed values from memory. Each cache includes a cache array and a cache directory. An associated cache controller manages the transfer of data and instructions between the processor core or system memory and the cache. Typically, the cache directory also contains a series of bits utilized to track the coherency states of the data in the cache.

With multiple caches within the memory hierarchy, a coherency structure (e.g., a page frame table) is required for valid execution results in the MP. This coherency structure provides a single view of the contents of the memory to all of the processors and other memory access devices (e.g., I/O devices). A coherent memory hierarchy is maintained through the utilization of a coherency protocol, such as the MESI protocol. In the MESI protocol, an indication of a coherency state is stored in association with each coherency granule (e.g., a cache line or sector) of one or more levels of cache memories. Each coherency granule can have one of the four MESI states, which is indicated by bits in the cache directory.

The MESI protocol allows a cache line of data to be tagged with one of four states: "M" (modified), "E" (exclusive), "S" (shared), or "I" (invalid). The Modified state indicates that a coherency granule is valid only in the cache storing the modified coherency granule and that the value of the modified coherency granule has not been written to system memory. When a coherency granule is indicated as Exclusive, only that cache holds the data, of all the caches at that level of the memory hierarchy. However, the data in the Exclusive state is consistent with system memory. If a coherency granule is marked as Shared in a cache directory, the coherency granule is resident in the associated cache and possibly in at least one other, and all of the copies of the coherency granule are consistent with system memory. Finally, the Invalid state indicates that the data and address tag associated with a coherency granule are both invalid.

The state to which each coherency granule (e.g., cache line or sector) is set is dependent upon both a previous state of the data within the cache line and the type of memory access request received from a requesting device (e.g., a processor). Accordingly, maintaining memory coherency in the MP requires that the processors communicate messages across the system bus indicating their intention to read or write to memory locations. For example, when a processor desires to write data to a memory location, the processor must first inform all other processing elements of its intention to write data to the memory location and receive permission from all other processing elements to carry out the write operation. The permission messages received by the requesting processor indicate that all other cached copies of the contents of the memory location have been invalidated, thereby guaranteeing that the other processors will not access their stale local data.

In some MP systems, the cache hierarchy includes two or more levels. The level one (L1) cache is usually a private cache associated with a particular processor core in the MP system. The processor first looks for data in the level one cache. If the requested data block is not in the level one cache, the processor core then accesses the level two cache. This process continues until the final level of cache is referenced before accessing main memory. Some of the cache levels (e.g., the level three or L3 cache) maybe shared by multiple caches at the lower level (e.g., L3 cache may be shared by multiple L2 caches). Generally, the size of a cache increases as its level increases, but its speed decreases accordingly. Therefore, it is advantageous for system performance to keep data at lower levels of the cache hierarchy whenever possible.

Some modern MP systems employ a victim cache approach in the upper levels of the memory hierarchy. Implementing the L3 cache memory as a victim cache enables better utilization of cache capacity. Furthermore, since the L3 cache memory does not need to store all the contents of the L2 cache memories, an L3 victim cache and the system memory can have distinct data paths. This configuration can better accommodate the bandwidth requirements of larger numbers of on-die processors and increased levels of hardware multi-threading.

However, implementing a victim cache hierarchy in a MP system impacts system performance. Although victim caches traditionally store modified lines, writing back clean lines from the L2 to the L3 can help eliminate subsequent time-consuming memory accesses. When the L2 cache is full, clean lines residing in the L2 cache may be evicted to the L3 victim cache to accommodate a new entry in the L2 cache. Also, even though evicted lines are written back to the L3 from the L2 cache, a performance penalty is incurred from the processor's access to the L3 to retrieve a requested line that was missed in the L2 cache. Therefore, to address this performance penalty, there is a need for a system and method of implementing adaptive mechanisms for managing write backs for improved data processing system performance.

SUMMARY OF THE INVENTION

The present invention provides a system and method for managing cache hierarchies with adaptive mechanisms that improve performance by keeping more important data in faster levels of the hierarchy. In one embodiment, in response to selecting a data block for eviction from a level two cache (referred to as the source cache) from a collection of level two caches, a data structure is examined to determine whether an entry exists that indicates that the data block has been evicted from the source cache (or another cache at the same level as the source cache) to slower level caches (e.g., L3) or memory and subsequently retrieved. In response to determining that the entry exists in the data structure, the source cache (or other agent in the system) will select another cache from the same level (e.g., another L2 cache) to receive the data block upon eviction. If the data block is subsequently requested by any cache at the same level as the source cache, this improves the chances of retrieving the data block from faster caches, which results in improved performance.

The above-mentioned features, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
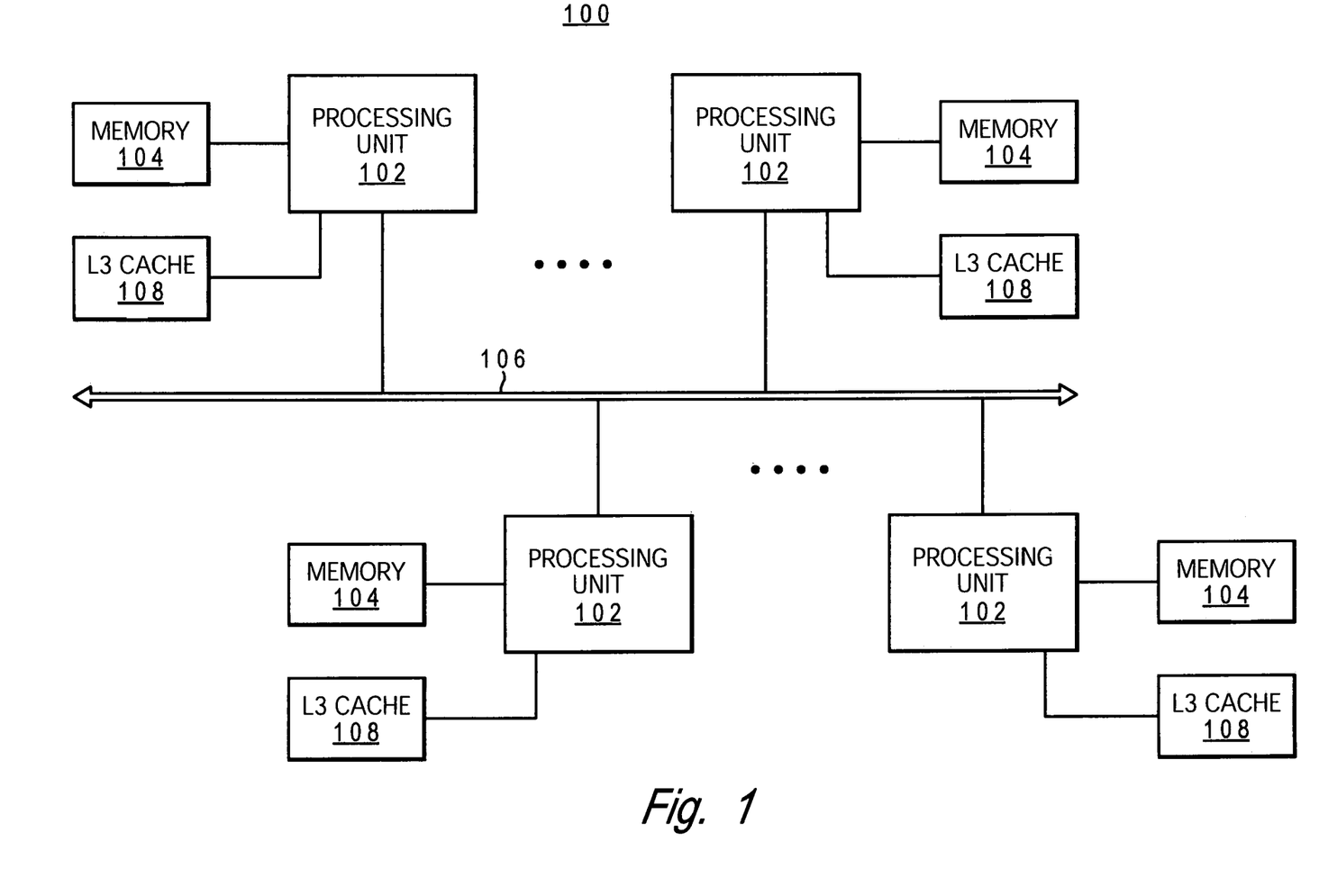
FIG. 1 is a block diagram of an exemplary multi-processor data processing system in which a preferred embodiment of the present invention may be implemented.

With reference now to the figures, and in particular, with reference to FIG. 1, there is illustrated a block diagram of a multi-processor data processing system 100 in which a preferred embodiment of the present invention may be implemented. As depicted, multi-processor data processing system 100 includes multiple processing units 102, which are each coupled to a respective one of memories 104. Each processing unit 102 is further coupled to an interconnect 106 that supports the communication of data, instructions, and control information between processing units 102. Also, L3 caches 108 are preferably coupled to processing units 102. Because of the lower latencies of cache memories as compared with memories 104, L3 caches 108 are utilized by processing units 102 as write back storage facilities for recently accessed data. Each processing unit 102 is preferably implemented as a single integrated circuit comprising a semiconductor substrate having integrated circuitry formed thereon. Multiple processing units 102 and at least a portion of interconnect 106 may be advantageously packaged together on a common backplane or chip carrier.

Those skilled in the art will appreciate that multi-processor data processing system 100 can include many additional components not specifically illustrated in FIG. 1. Because such additional components are not necessary for an understanding of the present invention, they are not illustrated in FIG. 1 or discussed further herein. It should also be understood that the enhancements to multi-processor data processing system 100 to implement adaptive mechanisms for managing write backs for improved data processing system performance provided by the present invention are applicable to data processing systems of any system architecture and are in no way limited to the generalized multi-processor architecture or symmetric multi-processing (SMP) architecture illustrated in FIG. 1.

Figure 2:
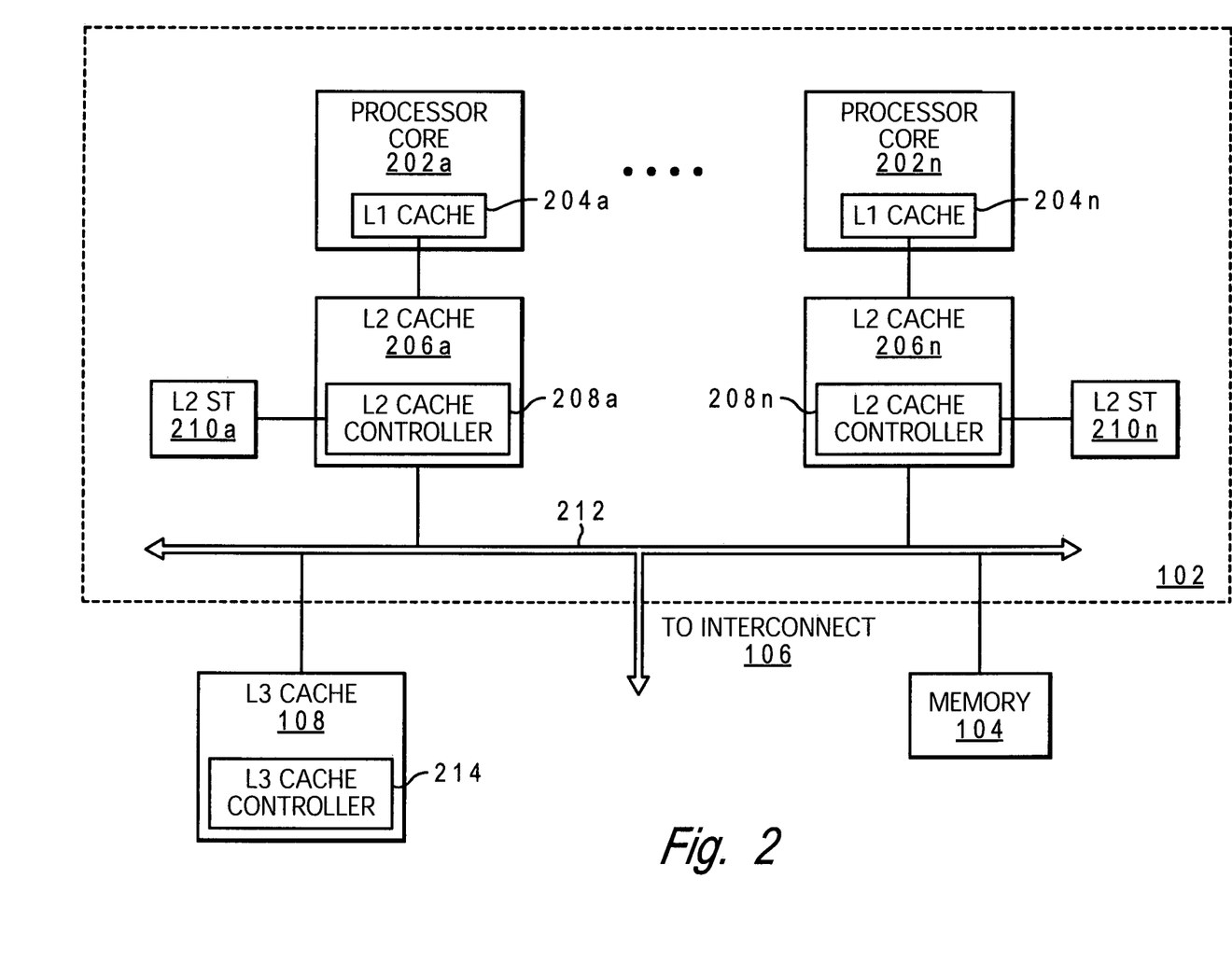
FIG. 2 is a block diagram of an exemplary processing unit in which a preferred embodiment of the present invention may be implemented.

Referring now to FIG. 2, there is a more detailed block diagram illustrating an exemplary processing unit 102 of FIG. 1 in which a preferred embodiment of the present invention may be implemented. As illustrated, processing unit 102 includes multiple processing cores 202a-n, each of which includes a respective one of L1 caches 204a-n. Coupled to each processor core 202a-n is a respective L2 cache 206a-n, which further includes an L2 cache controller 208a-n. An L2 snarf table 210a-n, which is discussed herein in more detail, is coupled to a respective L2 cache 206a-n. Intra-chip interconnect 212 couples all processing cores 202a-n within a processing unit 102. Intra-chip interconnect 212 is also coupled to interconnect 106, which couples L2 caches 206a-n to other processing units 102a-n within multi-processor data processing system 100.

Figure 3:
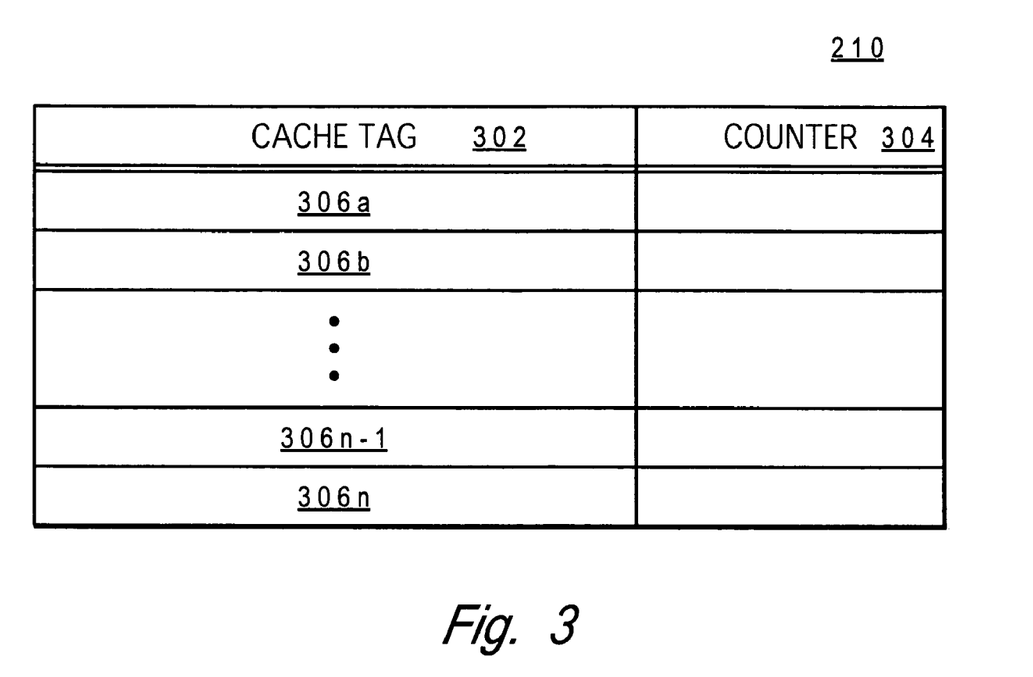
FIG. 3 is a block diagram illustrating an exemplary L2 snarf table in which a preferred embodiment of the present invention may be implemented.

FIG. 3 illustrates an exemplary L2 snarf table 210 in accordance with the present invention. L2 snarf table 210 includes entries 306a-n, each containing a cache tag field 302 and counter field 304. Cache tag field 302 indicates the specific cache line represented by the entry, and counter field 304 indicates the number of times the specific cache line has been written back and then missed on by any L2 cache. The operation of L2 snarf table 210 is discussed herein in more detail in conjunction with FIGS. 4A and 4B.

Figure 4A:
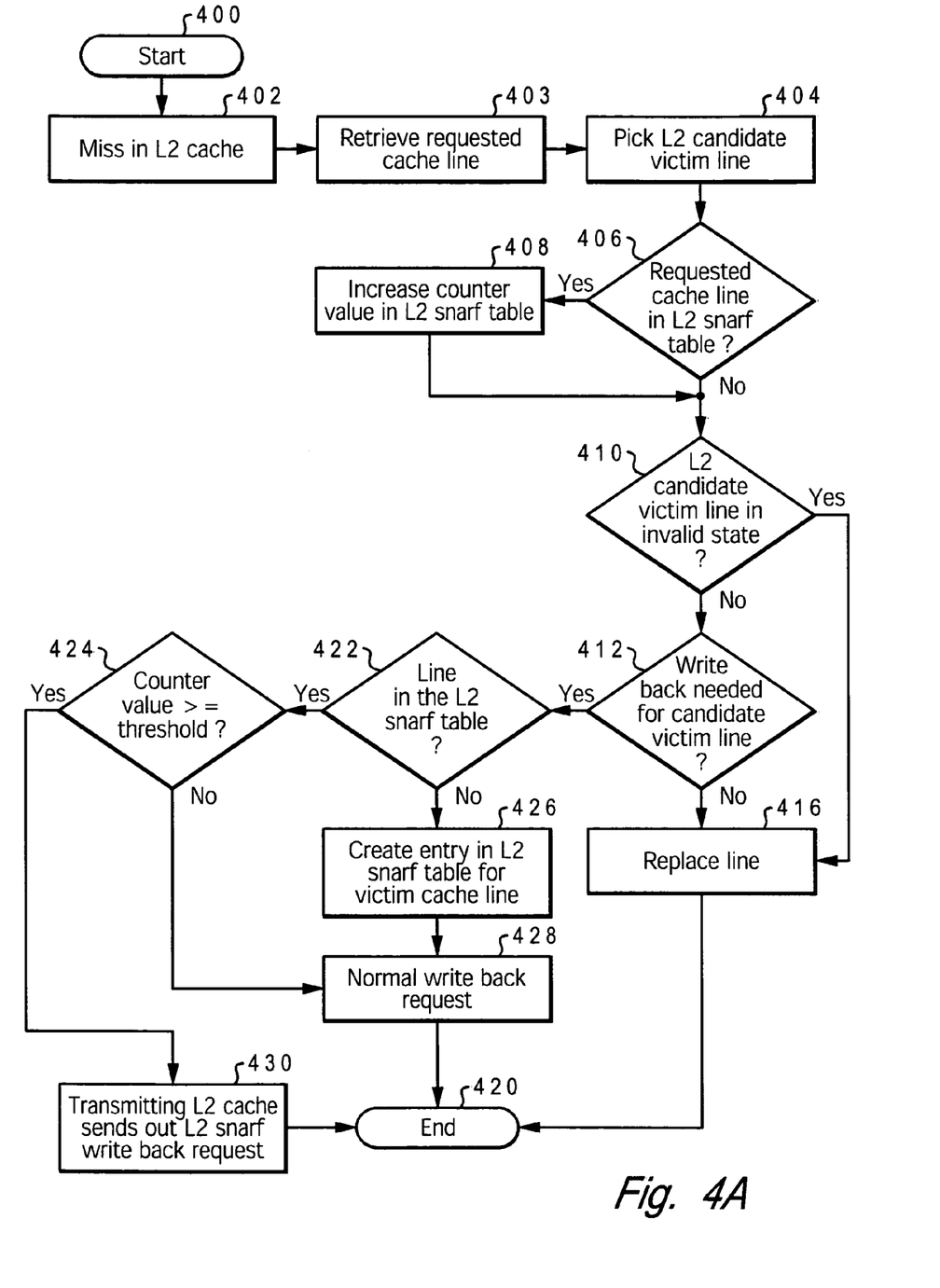
FIG. 4A is a high-level logical flowchart diagram depicting a method of resolving an L2 cache miss according to a preferred embodiment of the present invention.

Referring now to FIG. 4A, there is a high-level logical flowchart illustrating a method of resolving a L2 cache miss according to a preferred embodiment of the present invention.

The process begins at step 400 and proceeds to step 402, which illustrates a miss occurring in a source L2 cache 206a. Those with skill in this art will appreciate that after a cache miss, the cache will retrieve the requested cache line to fulfill the request. An exemplary embodiment of the present invention retrieves the requested cache line, as depicted in step 402, and simultaneously selects an L2 candidate victim line, as illustrated in step 404.

The process then determines whether the requested L2 cache line has been written back in the past by examining the contents of a source L2 snarf table 210a, as illustrated by step 406. If a source cache controller 208a determines that an entry 306a representing the requested cache line exists in source L2 snarf table 210a, the process continues to step 408, which depicts source cache controller 208a increasing a counter value in entry 306a. The contents of counter field 304 indicate the number of times the requested cache line represented by entry 306a has been written back to a slower level of the cache hierarchy and subsequently missed on. If the contents of counter field 304 exceed a predetermined value n, source cache controller 208a indicates that the requested cache line represented by entry 306a will be a candidate for an L2 snarf write back request when later written back, which is discussed herein in more detail. The process then continues to step 410.

However, if source L2 cache controller 208a determines that an entry 306a representing the requested cache line does not exist in the source L2 snarf table 210a, the process continues to step 410, which depicts source L2 cache controller 208a determining whether the selected L2 candidate victim line is in an Invalid state, according to the previously-discussed MESI protocol. If source L2 cache controller 208a determines that the selected L2 candidate victim line is in an Invalid state, the process continues to step 416.

If source L2 cache controller 208a determines that the selected L2 candidate victim line is not in an Invalid state, the process proceeds to step 412, which illustrates source L2 cache controller 208a determining whether a write back is needed for the selected L2 candidate victim line. If source L2 cache controller 208a determines that a write back is not needed for the selected L2 candidate victim line, the process continues to step 416, which illustrates source L2 cache controller 208a replacing the selected L2 candidate victim line with the requested cache line. The process then proceeds to step 420, which illustrates the process ending.

If source L2 cache controller 208a determines that a write back is needed for the selected L2 candidate victim line, the process continues to step 422, which illustrates source L2 cache controller 208a determining whether an entry 306a representing the selected L2 candidate victim line exists in the source L2 snarf table 210a. If source L2 cache controller 208a determines that an entry 306a representing the selected L2 candidate victim line does not exist in L2 snarf table 210a, the process proceeds to step 426, which illustrates source L2 cache controller 208a creating an entry 306a representing the selected L2 candidate victim line in L2 snarf table 210a. The process then continues to step 428, which depicts source L2 cache controller 208a performing a normal write back request with the selected L2 candidate victim line. The normal write back request preferably includes writing the selected L2 candidate victim line to L3 cache 108 or memory 104. The process proceeds to step 420, which illustrates the process ending.

Returning to step 422, if source L2 cache controller 208a determines that an entry 306a representing the selected L2 candidate victim line exists in source L2 snarf table 210a, the process continues to step 424, which illustrates source L2 cache controller 208a determining whether the value in counter field 304 is greater than or equal to previously-discussed predetermined threshold n. If the value in counter field 304 is greater than or equal to predetermined threshold n, the process proceeds to step 430, which illustrates source L2 cache controller 208a sending out on intra-chip interconnect 212 a L2 snarf write back request for selected L2 candidate victim line. The process then proceeds to step 420, which depicts the process ending.

Returning to step 424, if source L2 cache controller 208a determines that the value in counter field 304 in entry 306a representing the selected L2 candidate victim line is less than a predetermined value n, the process continues to step 428, which depicts source L2 cache controller 208a performing a normal write back request with the selected L2 candidate victim line. The normal write back request preferably includes writing the selected L2 candidate victim line to L3 cache 108 or memory 104. The process proceeds to step 420, which illustrates the process ending.

Figure 4B:
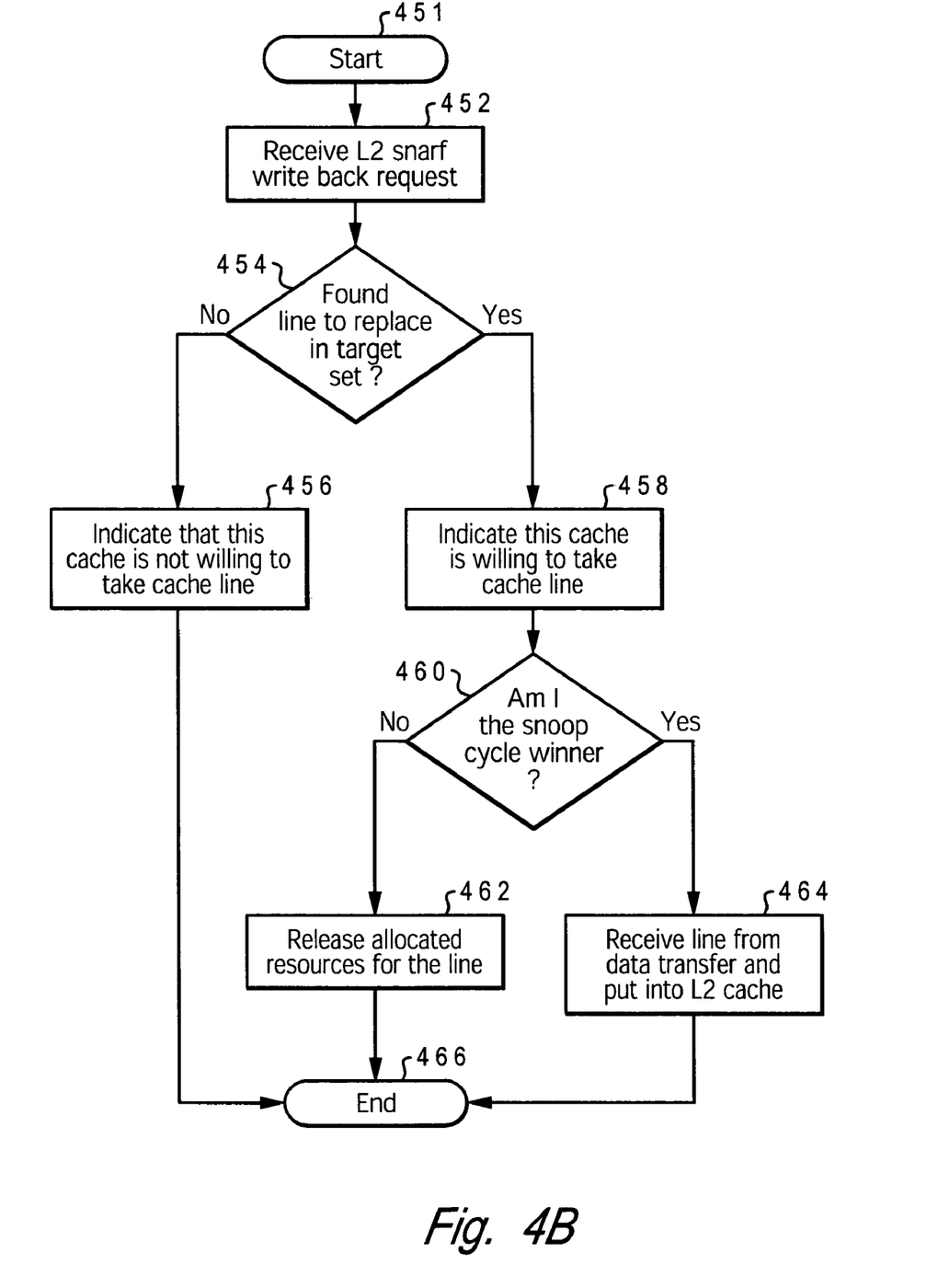
FIG. 4B is a high-level logical flowchart diagram illustrating a method of handling L2 snarf write back requests according to a preferred embodiment of the present invention.

FIG. 4B is a high-level logical flowchart illustrating an exemplary method of handling L2 snarf write back requests according to a preferred embodiment of the present invention. This exemplary method is performed at each L2 cache 206a-n. The process begins at step 451 and proceeds to step 452, which illustrates each L2 cache 206a-n receiving the L2 snarf write back request of source L2 cache 206a. The process then continues to step 454, which illustrates L2 caches 206a-n determining whether they can accommodate the L2 snarf write back request. Preferably, each L2 cache 206a-n determines whether a line within the cache may be replaced by a new cache line from the L2 snarf write back request. If a particular L2 cache 206a-n determines that a line within the cache may not be replaced by a new cache line from the L2 snarf write back request, the process continues to step 456, which depicts L2 cache 206a-n indicating that it is not willing to take the cache line from the L2 snarf write back request. The process then proceeds to step 466, which illustrates the process ending.

Returning to step 454, if L2 caches 206a-n determine that a line within the cache may be replaced by a new cache line from the L2 snarf write back request, the process proceeds to step 458, which illustrates an L2 cache 206a-n indicating that it can accept the new cache line.

Then, the process continues to step 460, which depicts L2 caches 206a-n determining whether they have been designated by source L2 cache controller 208a or other agent in the system to accept the L2 snarf write back request. Those with skill in this art will appreciate that any method of selection may be utilized. A preferred embodiment of the present invention utilizes a round-robin method, which ensures that one cache is not flooded with L2 snarf write backs. Another preferred embodiment of the present invention may utilize a random assignment feature where available L2 caches are designated as recipients of the L2 snarf write back request. If source L2 cache controller 208a (or other agent in the system) is able to identify a L2 cache 206a-n to accept the L2 snarf write back request, the identified L2 cache 206a-n services the cache line from the L2 snarf write back request. The process then proceeds to step 466, which illustrates the process ending.

However, if the source L2 cache controller 208a was not able to identify an available L2 cache to accept the L2 snarf write back request, the request fails and all resources allocated to handle the cache line are released, as depicted in step 462. The process then ends, as illustrated in step 466.

Only one L2 cache may be designated as the final recipient of a L2 snarf write back request. All other L2 caches that have indicated that they can accommodate the L2 snarf write back request will release all resources allocated to handle the cache line at the end of the request-response cycle.

All L2 caches 206a-n in each processing unit 102 are preferably able to service L2 snarf write back requests even though the associated processor core 202a-n is powered down for maintenance or as a power-conservation feature. This enables each processing unit 102 to have access to all L2 caches 206a-n for maximum memory available for L2 snarf write back requests.

What is claimed is:

1. A processing unit comprising:
   at least two processing cores;
   a memory hierarchy having a plurality of caches coupled to said at least two processing cores and characterized by slower response times at successively lower levels of said memory hierarchy; and
   a cache controller coupled to said plurality of caches, in response to selecting a data block for eviction from a source cache of said plurality of caches at a first level of said memory hierarchy, for examining a data structure to determine whether an entry exists that indicates that said data block has been evicted from any of said plurality of caches at said first level of said memory hierarchy to a slower level of said memory hierarchy and subsequently retrieved from said slower level of said memory hierarchy into any of said plurality of caches at said first level of said memory hierarchy, and in response to determining said entry exists in said data structure, for selecting another of said plurality of caches at said first level of said memory hierarchy to receive said data block from said source cache upon eviction.

2. The processing unit according to claim 1 wherein said cache controller in response to determining that said another of said plurality of caches already stores a copy of said data block, evicts said data block from said source cache without sending out said data block.

3. The processing unit according to claim 1, wherein said cache controller examines a counter field of said entry to determine a number of times said data block has been written back and subsequently missed upon.

4. The processing unit according to claim 1, wherein said cache controller selects said another of said plurality of caches utilizing a round-robin algorithm.

5. The processing unit according to claim 1, wherein said cache controller selects said another of said plurality of caches utilizing a random algorithm.

6. The processing unit according to claim 1, wherein said cache controller selects said another of said plurality of caches even though an associated processing core out of said at least two processing cores is powered down.

7. The processing unit according to claim 1, wherein said cache controller evicts said data block from said source memory cache into said another of said plurality of caches, in response to determining that a value in said counter field of said entry is greater than or equal to a predetermined value.

8. A method comprising:
in response to selecting a data block for eviction from a source cache of said plurality of caches at a first level of said memory hierarchy, examining a data structure to determine whether an entry exists that indicates that said data block has been evicted from any of said plurality of caches at said first level of said memory hierarchy to a slower level of said memory hierarchy and subsequently retrieved from said slower level of said memory hierarchy into any of said plurality of caches at said first level of said memory hierarchy; and
in response to determining said entry exists in said data structure, selecting another of said plurality of caches at said first level of said memory hierarchy to receive said data block from said source cache upon eviction.

9. The method according to claim 8, further comprising:
in response to determining that said another of said plurality of caches already stores a copy of said data block, evicting said data block from said source cache without sending out said data block.

10. The method according to claim 8, wherein said examining further comprises:
examining a counter field of said entry to determine a number of times said data block has been written back and subsequently missed upon.

11. The method according to claim 8, wherein said selecting further comprises:
selecting said another of said plurality of caches utilizing a round-robin algorithm.

12. The method according to claim 8, wherein said selecting further comprises:
selecting said another of said plurality of caches utilizing a random algorithm.

13. The method according to claim 8, wherein said selecting further comprises:
selecting said another of said plurality of caches even though an associated processing core out of said at least two processing cores is powered down.

14. The method according to claim 8 further comprises:
evicting said data block from said source memory cache into said another of said plurality of caches, in response to determining that a value in said counter field of said entry is greater than or equal to a predetermined value.

15. A computer-readable medium storing a computer program product comprising instructions for:
in response to selecting a data block for eviction from a source cache of said plurality of caches at a first level of said memory hierarchy, examining a data structure to determine whether an entry exists that indicates that said data block has been evicted from any of said plurality of caches at said first level of said memory hierarchy to a slower level of said memory hierarchy and subsequently retrieved from said slower level of said memory hierarchy into any of said plurality of caches at said first level of said memory hierarchy; and
in response to determining said entry exists in said data structure, selecting another of said plurality of caches at said first level of said memory hierarchy to receive said data block from said source cache upon eviction.

16. The computer-readable medium according to claim 15, further comprising instructions for:
in response to determining that said another of said plurality of caches already stores a copy of said data block, evicting said data block from said source cache without sending out said data block.

17. The computer-readable medium according to claim 15, further comprising instructions for:
examining a counter field of said entry to determine a number of times said data block has been written back and subsequently missed upon.

18. The computer-readable medium according to claim 15, wherein said instructions for selecting further comprise instructions for:
selecting said another of said plurality of caches utilizing a round-robin algorithm.

19. The computer-readable medium according to claim 15, wherein said instructions for selecting further comprise instructions for:
selecting said another of said plurality of caches utilizing a random algorithm.

20. The computer-readable medium according to claim 15, wherein said instructions for selecting further comprise instructions for:
selecting said another of said plurality of caches even though an associated processing core out of said at least two processing cores is powered down.

21. The computer-readable medium according to claim 15, further comprising instructions for:
evicting said data block from said source memory cache into said another of said plurality of caches, in response to determining that a value in said counter field of said entry is greater than or equal to a predetermined value.

22. A data processing system comprising:
a plurality of processing units further comprising:
at least two processing cores;

a memory hierarchy having a plurality of caches coupled to said at least two processing cores and characterized by slower response times at successively lower levels of said memory hierarchy;

a cache controller coupled to said plurality of caches, in response to selecting a data block for eviction from a source cache of said plurality of caches at a first level of said memory hierarchy, for examining a data structure to determine whether an entry exists that indicates that said data block has been evicted from any of said plurality of caches at said first level of said memory hierarchy to a slower level of said memory hierarchy and subsequently retrieved from said slower level of said memory hierarchy into any of said plurality of caches at said first level of said memory hierarchy, and in response to determining said entry exists in said data structure, for selecting another of said plurality of caches at said first level of said memory hierarchy to receive said data block from said source cache upon eviction; and a system memory coupled to said plurality of processing units.

23. The data processing system according to claim 22, said cache controller in response to determining that said another of said plurality of caches already stores a copy of said data block, evicts said data block from said source cache without sending out said data block.

24. The data processing system according to claim 22, wherein said cache controller examines a counter field of said entry to determine a number of times said data block has been written back and subsequently missed upon.

25. The data processing system according to claim 22, wherein said cache controller selects said another of said plurality of caches utilizing a round-robin algorithm.

26. The data processing system according to claim 22, wherein said cache controller selects said another of said plurality of caches utilizing a random algorithm.

27. The data processing system according to claim 22, wherein said cache controller selects said another of said plurality of caches even though an associated processing core out of said at least two processing cores is powered down.

28. The data processing system according to claim 22, wherein said cache controller evicts said data block from said source memory cache into said another of said plurality of caches, in response to determining that a value in said counter field of said entry is greater than or equal to a predetermined value.

* * * * *